(12) United States Patent
Peterson et al.

(10) Patent No.: US 10,484,793 B1
(45) Date of Patent: Nov. 19, 2019

(54) ELECTRONIC DEVICES WITH ORIENTATION SENSING

(71) Applicant: Apple Inc., Cupertino, CA (US)

(72) Inventors: Jonathan R. Peterson, Los Gatos, CA (US); Daniel D. Sunshine, Sunnyvale, CA (US); Yohji Hamada, Wakayama (JP); Daniel A. Podhajny, San Jose, CA (US); Kathryn P. Crews, San Francisco, CA (US); Jahan C. Minoo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/245,582

(22) Filed: Aug. 24, 2016

Related U.S. Application Data

(60) Provisional application No. 62/209,517, filed on Aug. 25, 2015.

(51) Int. Cl.
*H04R 5/04* (2006.01)
*H04R 5/033* (2006.01)
*G06F 3/044* (2006.01)

(52) U.S. Cl.
CPC ............. *H04R 5/04* (2013.01); *G06F 3/044* (2013.01); *H04R 5/033* (2013.01)

(58) Field of Classification Search
CPC ... H04R 1/10; H04R 5/00; H04R 5/04; H04R 5/033; H04R 2201/10
USPC ........................... 381/74, 309, 370
See application file for complete search history.

(56) References Cited

U.S. PATENT DOCUMENTS

| 8,831,242 B2 | 9/2014 | Brown et al. |
| 2010/0109486 A1* | 5/2010 | Polyakov .............. G06F 3/0202 310/365 |
| 2010/0310087 A1 | 12/2010 | Ishida |
| 2011/0228950 A1 | 9/2011 | Abrahamsson et al. |
| 2012/0114132 A1 | 5/2012 | Abrahamsson et al. |
| 2012/0229248 A1 | 9/2012 | Parshionikar et al. |

(Continued)

FOREIGN PATENT DOCUMENTS

| JP | 2014-45312 A | 3/2014 | |
| JP | 2014-75312 | * 3/2014 | ............. H04R 5/033 |

OTHER PUBLICATIONS

"Synchros S400BT, Wireless On-Ear Bluetooth Stereo Headphone", Harman International Industries, Inc., 2014, 2 pages.

*Primary Examiner* — Khai N. Nguyen
*Assistant Examiner* — Sabrina Diaz
(74) *Attorney, Agent, or Firm* — Treyz Law Group, P.C.; G. Victor Treyz; David K. Cole

(57) ABSTRACT

An electronic device such as a pair of headphones may be provided with left and right speakers for playing audio to a user. Control circuitry in the electronic device may play audio through the speakers in an unreversed configuration in which left channel audio is played through a first of the speakers that is adjacent to a left ear of the user and right channel audio is played through a second of the speakers that is adjacent to a right ear of the user or a reversed configuration in which these channel assignments are reversed. The headphones may have ear cups that house the speakers. Capacitive touch sensors, force sensors, and other sensors on the ear cups may measure ear shapes and finger grip positions on the ear cups to determine whether to operate in the unreversed or reversed configuration. Sensors may gather gestures and other user touch input.

18 Claims, 17 Drawing Sheets

(56) References Cited

U.S. PATENT DOCUMENTS

| | | | |
|---|---|---|---|
| 2013/0177166 A1 | 7/2013 | Agevik et al. | |
| 2013/0279724 A1* | 10/2013 | Stafford | H04R 1/1041 |
| | | | 381/309 |
| 2013/0339850 A1* | 12/2013 | Hardi | G06F 3/016 |
| | | | 715/702 |
| 2014/0051940 A1 | 2/2014 | Messerschmidt | |
| 2014/0072136 A1 | 3/2014 | Tenenbaum et al. | |
| 2014/0168135 A1 | 6/2014 | Saukko et al. | |
| 2015/0063586 A1 | 3/2015 | Shah | |
| 2015/0230020 A1* | 8/2015 | Jeon | H04R 1/1091 |
| | | | 381/74 |
| 2015/0237183 A1 | 8/2015 | Novet | |
| 2015/0363027 A1* | 12/2015 | Hu | G06F 1/163 |
| | | | 345/174 |
| 2017/0371470 A1* | 12/2017 | Nathan | G06F 3/0414 |

* cited by examiner

ELECTRONIC DEVICES WITH ORIENTATION SENSING

This application claims the benefit of Provisional Patent Application No. 62/209,517, filed Aug. 25, 2015, which is hereby incorporated by reference herein in its entirety.

BACKGROUND

This relates generally to electronic devices, and, more particularly, to electronic devices such as headphones.

Electronic devices such as headphones may contain wireless circuitry for communicating with external equipment. The wireless circuitry may receive music and other audio content from remote equipment. The audio content can be played back to the user with speakers.

Audio content is often provided in a stereo format. Stereo audio has left and right channels. If care is not taken, a pair of headphones may be placed on a user's head in a reversed configuration. In the reversed configuration, left-channel stereo audio is played into the user's right ear and right-channel stereo audio is played into the user's left ear. This type of reversed audio may detract significantly from a user's experience. For example, if a user is watching accompanying video content, the reversed audio left-channel audio will not be properly synchronized with on-screen content, which can be disorienting for the user. Users may also face challenges when adjusting media playback settings while wearing headphones.

It would therefore be desirable to be able to provide improved electronic devices such as stereo headphones.

SUMMARY

An electronic device such as a pair of headphones may be provided with left and right speakers for playing audio to a user. The left and right speakers may be housed in left and right portions of the headphones such as left and right ear cups.

Control circuitry in the electronic device may play audio through the speakers in an unreversed configuration in which left channel audio is played through a first of the speakers that is adjacent to a left ear of the user and right channel audio is played through a second of the speakers that is adjacent to a right ear of the user or a reversed configuration in which the right channel audio is played through the first speaker that adjacent to the left ear and the left channel audio is played through the second speaker that is adjacent to the right ear. Capacitive touch sensors, force sensors, and other sensors on the ear cups may measure ear shapes and finger grip patterns on the ear cups to determine whether to operate in the unreversed or reversed configuration.

Sensors for measuring ear shape may be located on inner surfaces of the ear cups. Sensors may also be located on opposing outer ear cup surfaces. A peripheral strip of sensor elements may run along a curved intermediate surface between the inner and outer cup surfaces. Grip detection sensing may be performed using the peripheral strip of sensor elements. A user may supply touch gestures and other touch input to touch sensors on outer ear cup surfaces. User input may, for example, be used in adjusting audio playback volume and other audio playback settings.

DETAILED DESCRIPTION

Figure 1:
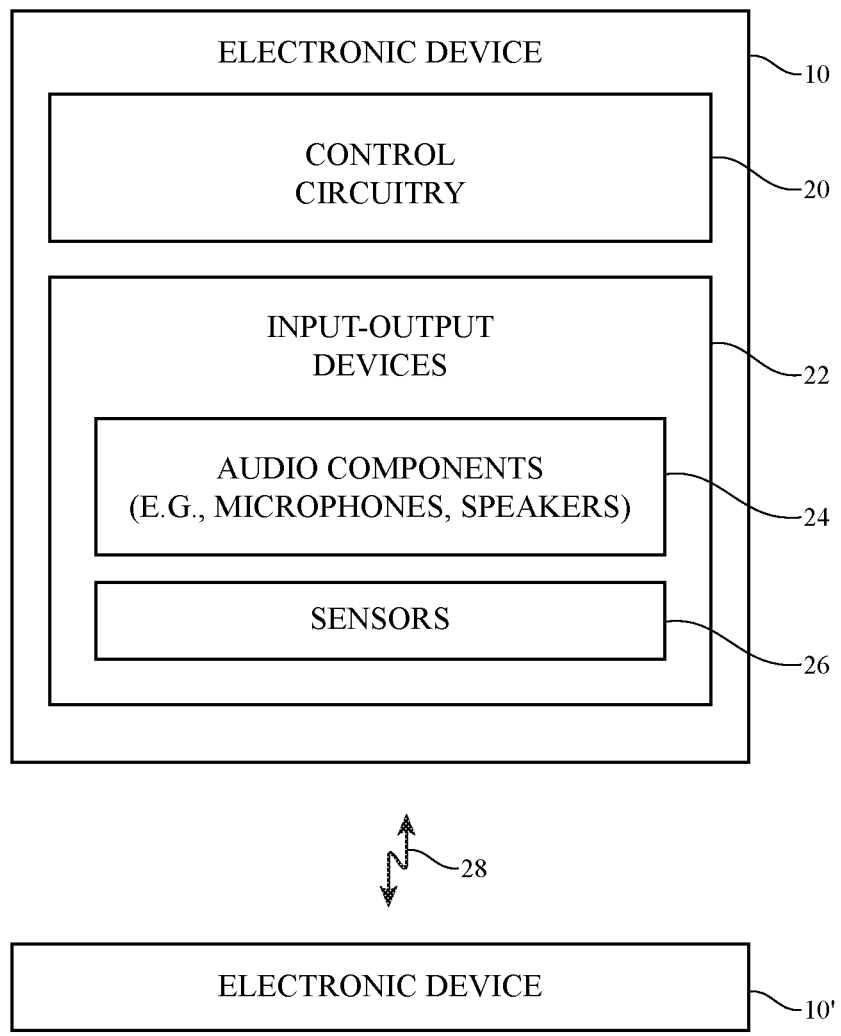
FIG. 1 is a schematic diagram of an illustrative electronic device in accordance with an embodiment.

An electronic device may be provided with sensors that monitor how the device is oriented relative to the body of a user. The sensors may, for example, include touch sensors and other sensors that monitor how a user is holding a pair of headphones or other device while putting the headphones or other device onto the head of the user or other body part and that monitor ear patterns or other body part patterns to determine how the headphones or other device is being worn by the user. Based on knowledge of the orientation of the headphones on the user's head or other orientation information, the headphones or other electronic device can be configured appropriately. For example, left and right stereo headphone channel assignments may be placed in a normal or reversed configuration, and other device settings may be changed. If desired, user input such as touch input may be used to adjust media playback settings and other device settings.

Touch sensor structures may be formed from thin layers of fabric, thin printed circuit substrates, and other thin layers of other material and may therefore sometimes be referred to touch sensor layers. The touch sensor layers in an electronic device may be formed on rigid substrates such as rigid printed circuit board layers and/or may be formed on flexible substrates (e.g., flexible printed circuit material such as flexible layers of polyimide or sheets of other flexible polymer material). In some configurations, touch sensor structures may be formed from printed coatings on a fabric or from conductive yarns or other strands of material in a fabric.

In general, the strands of material that form the fabric may be monofilaments, may be multifilament strands (sometimes referred to herein as yarns), may be formed from metal (e.g., metal monofilaments and/or yarns formed from multiple monofilament wires), may be formed from dielectric (e.g., polymer monofilaments and yarns formed from multiple polymer monofilaments), may include dielectric cores covered with conductive coatings such as metal (e.g., metal coated dielectric monofilaments and yarns of metal coated polymer-core monofilaments may be used to form conductive monofilaments and conductive yarns, respectively), may include outer insulating coatings (e.g., coatings of polymers or other dielectrics may surround each metal-clad polymer monofilament or each collection of metal-clad polymer monofilaments in a yarn, polymer insulation may enclose a multifilament metal wire, etc.), or may be other suitable strands of material for forming fabric. Configurations in which the fabric is formed from yarns (e.g., multifilament strands of material that are insulating or that contain metal wires and/or metal coatings on polymer monofilaments to render the yarns conductive) may sometimes be described herein as an example. This is, however, merely illustrative. The fabric may be formed using monofilaments, multifilament strands of material (yarns), combinations of these arrangements, etc. The fabric may be woven, knitted, braided, or may contain yarns or other strands of material that have been intertwined using other intertwining techniques. Touch sensor structures may be formed on the ear cups in a pair of headphones or on other portions of an electronic device.

FIG. 1 is a schematic diagram of an illustrative electronic device. As shown in FIG. 1, electronic device 10 may communicate wirelessly with external equipment such as electronic device 10' using wireless link 28. Wireless signals for link 28 may be light-based signals, may be acoustic signals, and/or may be radio-frequency signals (e.g., wireless local area network signals, Bluetooth® signals, radio-frequency signals in cellular telephone band, signals at 60 GHz, near field communications signals, etc.). Equipment 10 and equipment 10' may have antennas and wireless transceiver circuitry for supporting wireless communications over link 28. Equipment 10' may have the same capabilities as equipment 10 (i.e., devices 10 and 10' may be peer devices) or equipment 10' may include fewer resources or more resources than device 10.

Illustrative device 10 of FIG. 1 has control circuitry 20. Control circuitry 20 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 20 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 22 may be used to allow data to be supplied to device 10 and to allow data to be provided from device 10 to external devices. Input-output devices 22 may include buttons, joysticks, scrolling wheels, touch pads, key pads, keyboards, tone generators, vibrators, cameras, sensors 26 (e.g., ambient light sensors, proximity sensors, magnetic sensors, force sensors, touch sensors, accelerometers, and other sensors), light-emitting diodes and other status indicators, data ports, displays, etc. Input-output devices 22 may include audio components 24 such as microphones and speakers (e.g., left and right speakers in a pair of earbuds, in ear cups in over-the-ear headphones, in ear cups in on-the-ear headphones, or other earphones). A user can control the operation of device 10 by supplying commands through input-output devices 22 and may receive status information and other output from device 10 using the output resources of input-output devices 22.

Control circuitry 20 may be used to run software on device 10 such as operating system code and applications. During operation of device 10, the software running on control circuitry 20 may use sensors 26 and other input-output devices 22 in device 10 to gather input from a user. A user may, for example, supply touch input using one or more fingers and/or other external objects (e.g., a stylus, etc.). Touch sensor input may also be gathered from touch sensors in contact with the ears of a user (or in contact with other body parts). This touch sensor input may help device 10 determine the orientation of device 10 with respect to the user's head or other body part. For example, by identifying which ear cup of a pair of headphones is covering the right ear of the user and which ear cup is covering the left ear, device 10 can determine whether the headphones are being worn in an unreversed or in a reversed configuration and can make audio adjustments accordingly (e.g., by adjusting left/right channel assignments).

Figure 2:
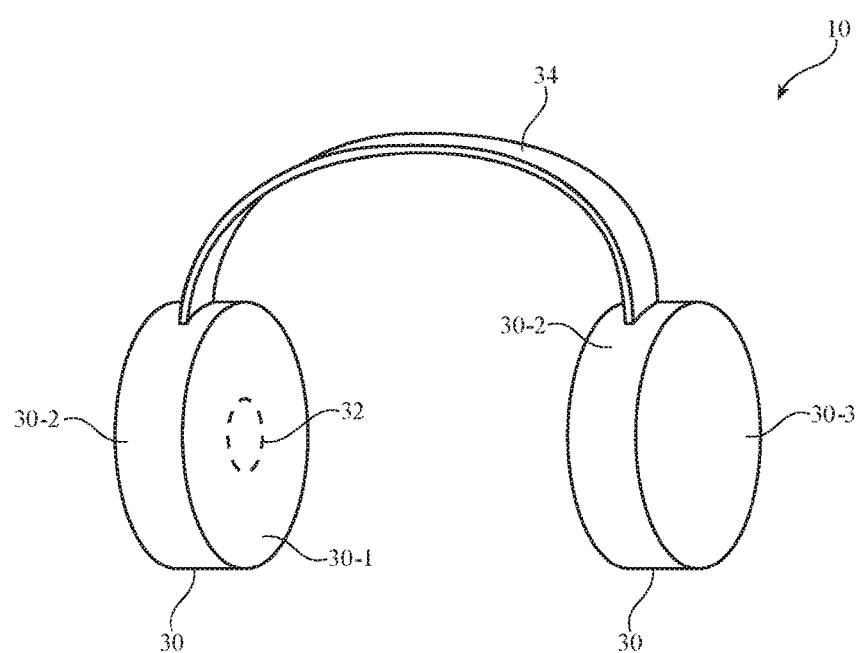
FIG. 2 is a perspective view of an illustrative electronic device such as a pair of headphones in accordance with an embodiment.

Electronic device 10 (and external equipment 10') may, in general, be any suitable electronic equipment. Electronic device 10 (and device 10') may, for example, be a computing device such as a laptop computer, a computer monitor containing an embedded computer, a tablet computer, a cellular telephone, a media player, or other handheld or portable electronic device, a smaller device such as a wristwatch device (e.g., a watch with a wrist strap), a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. FIG. 2 is a perspective view of an illustrative electronic device. In the illustrative configuration of FIG. 2, device 10 is a portable device such as a pair of headphones (earphones). Other configurations may be used for device 10 if desired. The example of FIG. 2 is merely illustrative.

As shown in FIG. 2, device 10 may have ear cups such as ear cups 30. There may be two ear cups 30 in device 10 that are coupled by a support such as band 34. Band 34 may be flexible and may have a curved shape to accommodate a user's head. There may be left and right ear cups 30 in device 10, one for one of the user's ears and the other for the other one of the user's ears. Each ear cup may have an area such as area 32 through which sound may be emitted from a speaker (e.g., a speaker system with one or more drivers). When worn in an unreversed configuration, the right ear cup of device 10 will supply audio to the right ear of the user and the left ear cup of device 10 will supply audio to the left ear of the user. In a reversed configuration, the right ear cup is adjacent to the user's left ear and the left ear cup is adjacent to the user's right ear. For correct audio playback, the assignment of the left and right channels of audio that are being played back to the user can be reversed (so that the left channel of audio is played through the right ear cup and vice versa) whenever device 10 is being worn in the reversed configuration. Unreversed right-left channel assignments may be used when device 10 is being worn in the unreversed configuration.

Device 10 may have an asymmetrical design or may have a symmetrical design. A symmetrical design may be used to provide device 10 with enhanced aesthetics. In some configurations for device 10 (e.g., when device 10 has a symmetrical design), there may be few or no recognizable differences between unreversed and reversed orientations for device 10. In this type of scenario, it may be desirable to use touch sensor input or input from other sensors 26 to determine whether to operate device 10 in an unreversed audio playback or reversed audio playback configuration.

To gather input from device 10, one or more of the external surfaces of band 34 and/or ear cups 30 may be provided with input-output devices 22 such as sensors 26. As an example, touch sensors or other sensors may be provided on inner ear cup surfaces 30-1 to measure a user's ear shapes, may be provided on opposing outer ear cup surfaces 30-3 (e.g., to gather input from a user's fingers or other external objects), and may be provided on the intermediate portions of the surfaces of ear cups 30 such as circumferential surfaces 30-2, which run around the periphery of cups 30 between inner surfaces 30-1 and outer surfaces 30-3 (e.g., to gather user grip information and other input).

Touch input to surfaces such as surfaces 30-1, 30-2, and/or 30-3 may include multi-touch input (e.g., simultaneous touch input from multiple locations), multi-touch gesture input and other gestures (e.g., swipes, finger pinches, taps, etc.), touch data associated with temporary contact with the user's fingers while ear cups 30 are being held by a user who is putting device 10 on the user's ears, touch data associated with the (potentially prolonged) contact between touch sensor arrays on inner surfaces 30-1 and the ears of the user, or other touch input. Non-touch input from a user and/or the environment surrounding device 10 may also be gathered using sensors 26.

Figure 3:
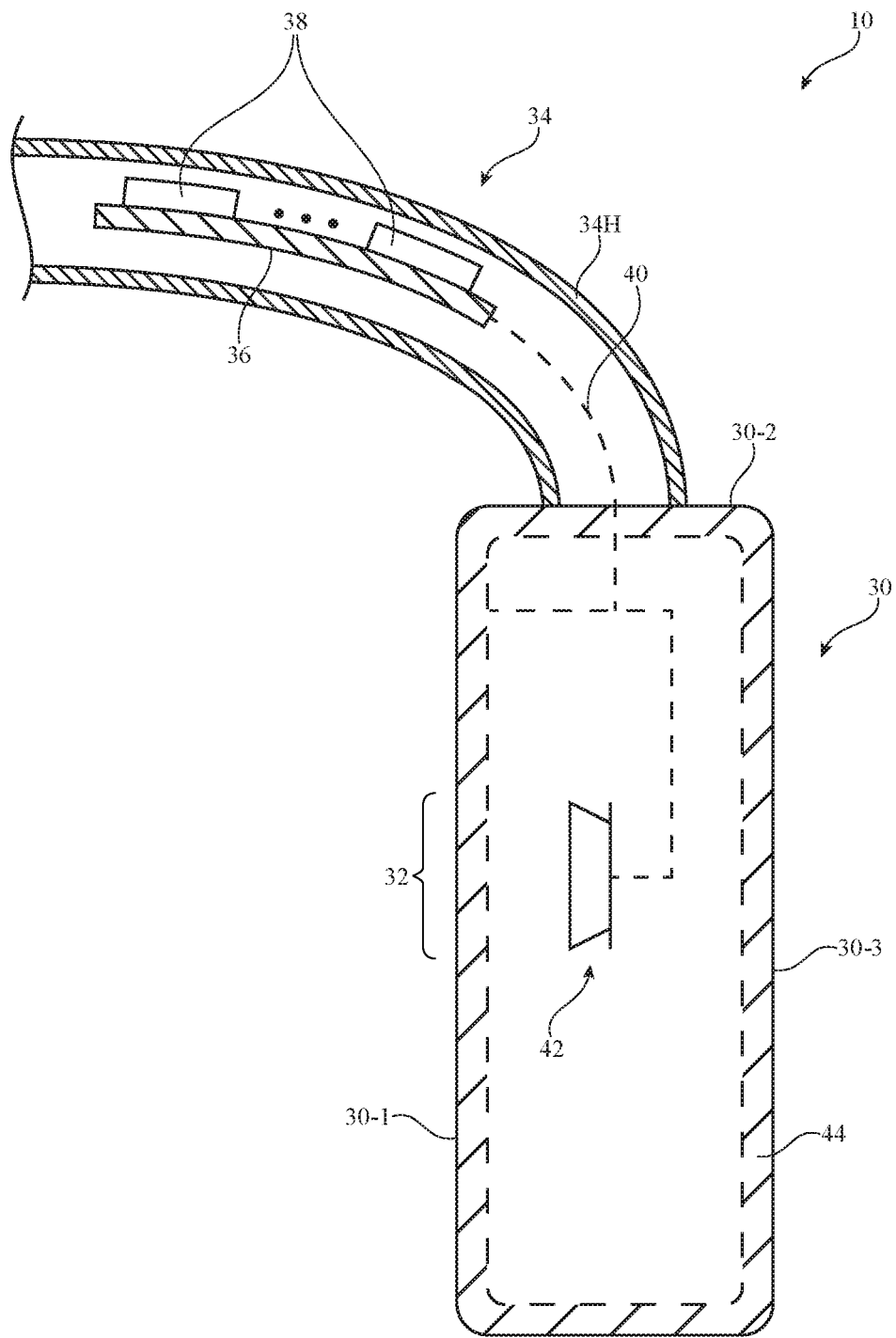
FIG. 3 is a cross-sectional side view of a portion of an electronic device in accordance with an embodiment.

A cross-sectional side view of a portion of device 10 of FIG. 2 is shown in FIG. 3. As shown in FIG. 3, band 34 may have band walls 34H (e.g., plastic walls, fabric walls, walls formed from metal or other materials, etc.). Electrical components 38 (e.g., control circuitry 20 and/or input-output devices 22, batteries, and/or other electrical circuitry) may be mounted on one or more substrates such as substrate 36 (e.g., a printed circuit such as a rigid printed circuit board formed from fiberglass-filled epoxy or other rigid printed circuit board material or a flexible printed circuit having a substrate formed from a flexible polymer such as a sheet of polyimide). Metal traces and other signal paths 40 may be used to couple circuitry 38 to sensor structures 44 on the surfaces of ear cups 30 and may be used to couple circuitry 38 to speakers 42. Each ear cup 30 may have a region such as region 32 through which sound is emitted from a corresponding speaker 42 while inner cup surfaces 30-1 are being worn against the user's head (e.g., on or over the user's ears). Region 32 may have an opening (e.g., a speaker port) and/or may be covered with an acoustically transparent material such as fabric, open cell foam, a metal or plastic structure with an array of openings, etc.

Sensor structures 44 may be formed on inner surfaces 30-1, outer surfaces 30-3, and intermediate surfaces 30-2 and may include touch sensors and other sensors 26. Sensor structures 44 may include touch sensor structures formed from yarns of conductive material (e.g. individual conductive yarns woven within a non-conductive fabric structure to form a capacitive touch sensor array), from conductive materials (e.g., conductive ink) that is printed in patterns on ear cups 30 (either directly on ear cups, or printed onto a laminate film/adhesive/intermediate layer that is then adhered to the ear cups), from metal traces on printed circuits and other substrates, from patterned metal foil, from metal housing structures and other metal parts, from non-metallic structures, and from other structures.

Touch sensors in device 10 may be formed using any suitable touch technology. As an example, touch sensors may be formed from one or more patterned layers of capacitive touch sensor electrodes. Other types of touch sensor may be used in device 10 if desired (e.g., touch sensors based on resistive touch technology, acoustic touch technology, light-based touch sensors, etc.). In some scenarios, sensor arrays may be provided that are sensitive to the amount of force applied by a user's body part of other external object. This type of sensor may also gather information on the position of a user's finger or other external object (as with a touch sensor) but is sometimes referred to as a force sensor because not all touch sensors are sensitive to different amounts of applied force.

If desired, hybrid sensors may be provided. A hybrid sensor may gather input using multiple different sensor technologies. An example of a hybrid sensor that may be used in gathering input for device 10 is a hybrid capacitive touch-force sensor. This type of sensor may make capacitive measurements to determine where a user's touch input is being provided (e.g., to gather touch location information) and may make a different type of capacitive measurements to determine how forcefully the user's touch input is being applied (e.g., to gather force input).

Figure 4:
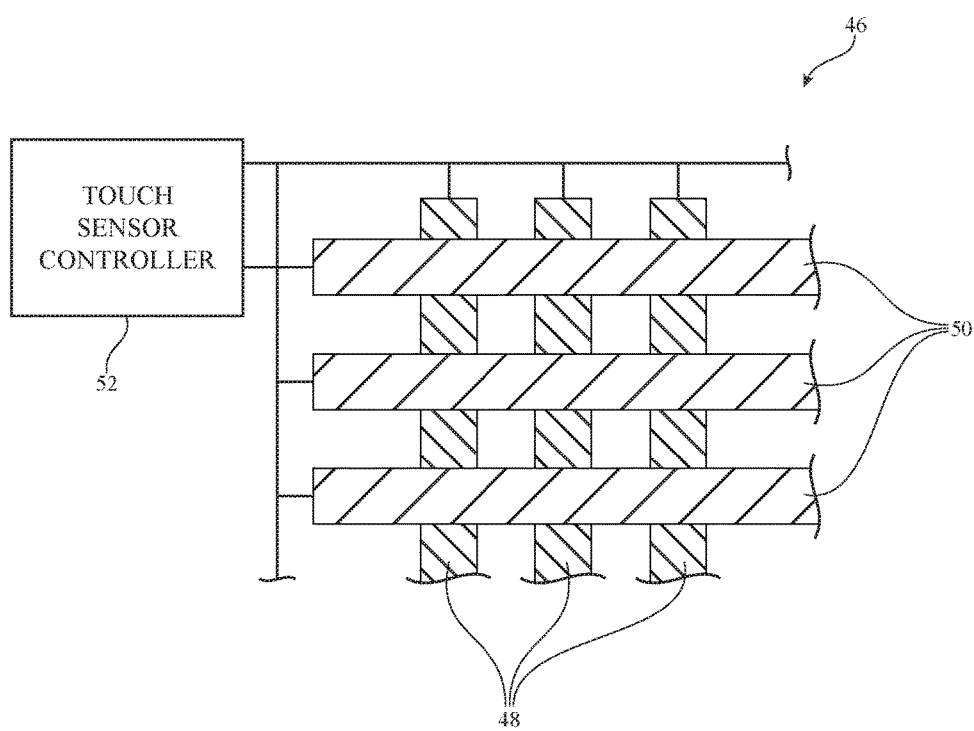
FIG. 4 is a diagram of an illustrative capacitive touch sensor in accordance with an embodiment.

An illustrative capacitive touch sensor array is shown in FIG. 4. Touch sensor 46 of FIG. 4 is a capacitive touch sensor having touch sensor electrodes 48 and 50. Touch sensor controller 52 may supply drive signals to the touch sensor electrodes while gathering corresponding sense signals from the electrodes. Using this type of arrangement or other touch controller arrangement, controller 52 may make capacitance measurements with electrodes 48 and 52 that allow controller 52 to determine the location of a user's touch within the electrodes (e.g., that allow controller 52 to identify the location at which the presence of the user's finger or other body part overlaps the array and therefore creates a localized reduction in electrode-to-electrode capacitance).

Electrodes 48 and 50 may be formed from transparent conductive material such as indium tin oxide or invisibly thin conductive lines or from opaque materials such as metal. Electrodes 48 and 50 may be formed on one side or on opposing sides of a flexible printed circuit, may be formed as multiple layers in a touch sensor coating formed on a fabric or foam layer or other structures in device 10, may be formed using single-sided electrode patterns, may be formed using double-sided electrode patterns, may be formed from conductive strands of material (e.g., dielectric yarns coated with a conductive material and, if desired, an outer coating of dielectric material, metal yarns of conductive material, etc.), may be formed using patterns of interconnected squares, diamonds, wedges, dots, or other capacitive electrode shapes, may have circular electrode shapes, may have curved shapes (e.g., full or partial ring shapes), may have radially symmetric shapes and/or rotationally symmetric shapes, or may be formed using any other suitable touch sensor configuration. The configuration of FIG. 4 in which sets of perpendicular touch sensor capacitive electrode strips are arranged in a grid of overlapping horizontal and vertical electrodes is merely illustrative.

Figure 5:
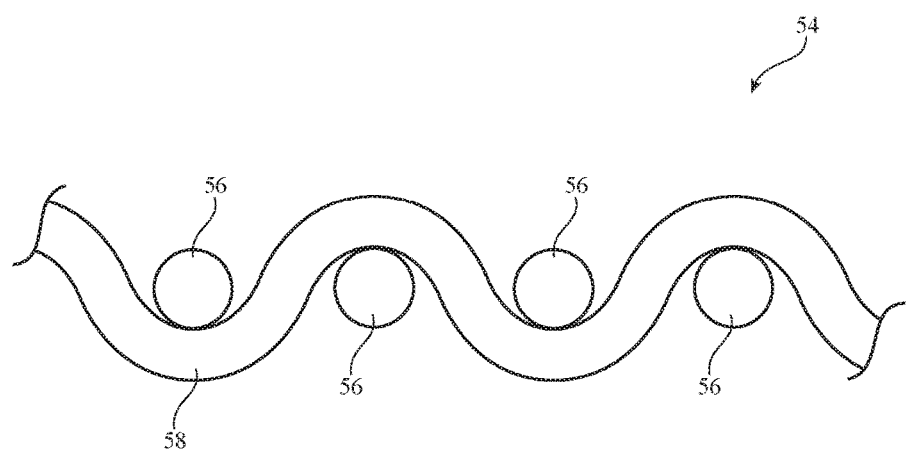
FIG. 5 is a top view of an illustrative fabric of the type that may be provided with conductive strands of material such as yarns or monofilaments to form a touch sensor in accordance with an embodiment.

If desired, an array of conductive paths for a capacitive touch sensor electrode grid or other conductive structures in device 10 may be formed using conductive yarns (or other conductive strands of material). As an example, consider fabric 54 of FIG. 5. As shown in FIG. 5, fabric 54 may contain intertwined strands of material such as yarns 56 and 58. Yarns 56 may be warp yarns and yarns 58 may be weft yarns in a woven fabric or fabric 54 may be formed using other intertwining techniques (e.g., knitting, braiding, etc.). Coatings may be formed on the upper and/or lower surface of fabric 54 (e.g., dielectric coatings and/or conductive coatings such as metal coatings). If desired, some of yarns (strands) 56 and/or some of yarns (strands) 58 may be conductive and may serve as electrodes such as capacitive electrodes 48 and 50 of FIG. 4. The number of conductive yarns (i.e., the number of yarns containing conductive material) may be smaller than the number of insulating yarns (e.g., the yarns formed from dielectric materials such as polymers) so that the conductive yarns are relatively sparse within fabric 54 or denser constructions with more conductive yarns may be used.

Components may be attached to the conductive yarns (or other strands of material) in fabric 54 (e.g., force sensors, light-based sensors, etc.). If desired, fabric 54 may be used as a covering for some or all of device 10 (e.g., on some or all of surfaces 30-1, 30-2, and 30-3 or elsewhere on device 10). In this type of arrangement, touch sensors or other sensors may be formed from the fabric that is located on the exterior of device 10. Fabric may also be used in forming internal sensor structures.

Figure 6:
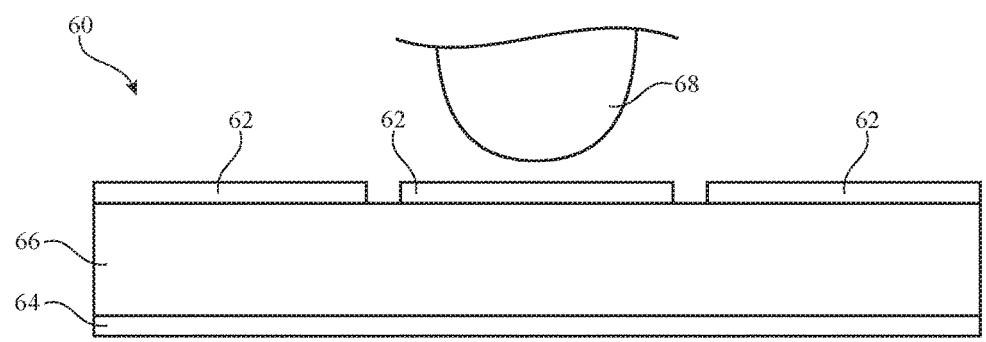
FIG. 6 is a cross-sectional side view of a portion of a sensor with electrodes separated by a compressible material in accordance with an embodiment.
Figure 7:
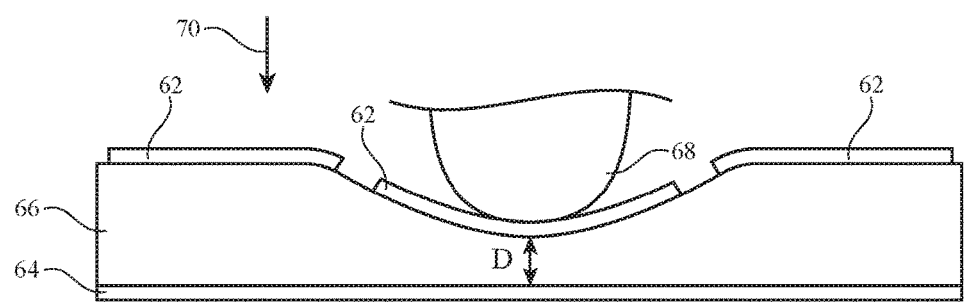
FIG. 7 is a cross-sectional side view of the sensor of FIG. 6 in a configuration in which the compressible material has been compressed so that the electrodes have moved closer to each other in accordance with an embodiment.

If desired, a fabric-based sensor or other sensor for device 10 may include force sensing components. Consider, as an example, force sensor 60 of FIG. 6. As shown in FIG. 6, force sensor 60 may have a layer of compressible material such as material 66. Material 66 may be formed from polymer foam or other compressible elastomeric material, from fabric, or other material that can be compressed when force is applied. Capacitor electrodes such as electrodes 62 may be patterned on a first surface of layer 66 and one or more electrodes such as illustrative ground electrode 64 may be formed on an opposing second surface of layer 66. When an external object such as object 68 (e.g., a user's finger, a user's ear, etc.) is not pressing against the first surface, layer 66 will not be compressed. As a result, the spacing between electrodes 62 and 64 will be at a maximum and the capacitance between electrodes 62 and electrode 64 will be minimized. In response to application of pressure in direction 70 by object 68, material 66 will compress, thereby decreasing the separation distance D between at least one of electrodes 62 and electrode 64 as shown in FIG. 7. This creates an increase in capacitance for the depressed electrode relative to ground 64. The amount of increase is proportional to the amount of force applied by object 68 in direction 70, so the output of force sensor 60 is a force value. The output of force sensor 60 also contains position information (e.g., the identity of the location of electrode 62 in the example of FIGS. 6 and 7), so force sensor 60 can also serve as a position sensor that senses where a user is applying force to sensor 60.

Figure 8:
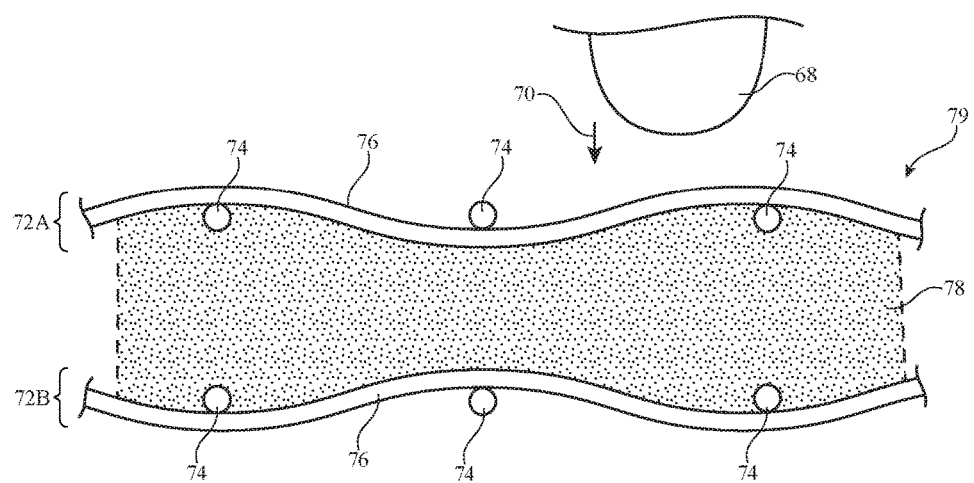
FIG. 8 is a cross-sectional side view of an illustrative sensor with two layers of fabric separated by a compressible structure in accordance with an embodiment.

FIG. 8 shows how a hybrid touch-force sensor may be formed using fabric layers separated by a compressible layer. Hybrid sensor 79 has first fabric layer 72A and second fabric layer 72B. First fabric layer 72A is separated from second fabric layer 72B by compressible layer 78 (e.g., foam, fabric, etc.). Each fabric layer may have strands of material such as strands 74 and 76. In layer 72A, these strands may serve as overlapping capacitive sensor electrodes for a touch sensor, as described in connection with strands 56 and 58 of touch sensor 54 (FIG. 5). In layer 72B, strands 74 and 76 may be shorted together to form a ground plane (as an example). A layer of metal foil, metal traces on a printed circuit, or other conductive materials may also be used to form a ground plane for layer 72B. When object 68 is present on the surface of layer 72B, the touch sensor capabilities of layer 72B may be used to gather touch sensor input (i.e., information on the position of object 68). When object 68 is pressed downwards, a capacitance increase is detected between an electrode(s) in fabric 72A and the ground plane formed by layer 72B (i.e., sensor 79 produces a force-dependent output signal). Sensor 79 may therefore be used to gather touch sensor input (independent of touch force) and force input related respectively to the position and force applied by object 68. The ability to gather both touch and force input allows a user to supply different types of input in different usage scenarios.

Figure 9:
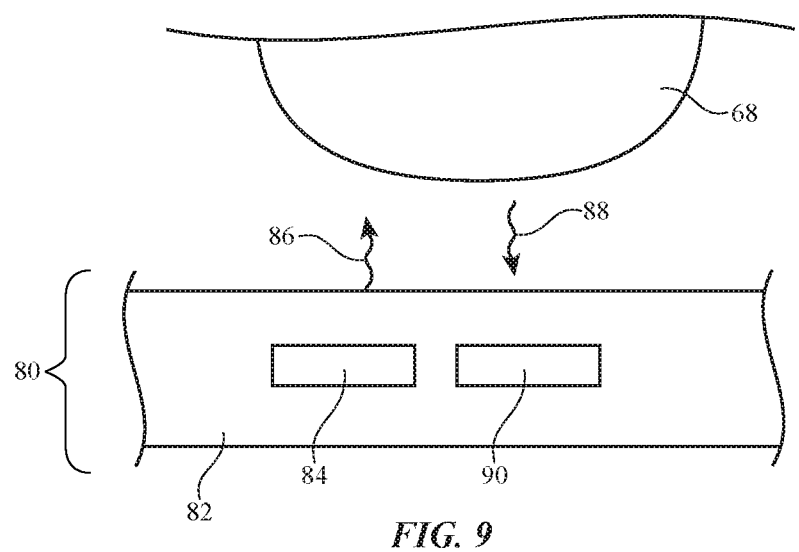
FIG. 9 is a side view of an illustrative light-based sensor for an electronic device in accordance with an embodiment.

If desired, sensors 26 may include touch sensors and force sensors using other types of components. In the example of FIG. 9, touch sensor 80 has an array of light emitters and detectors to gather touch input. Emitters 84 and detectors 90 may be mounted in one or more layers of material such as layer 82 (e.g., plastic, fabric, etc.). Emitters 84 may be light-emitting diodes or other light sources that produce light 86. In the absence of a nearby external object, light 86 is not reflected to any of detectors 90. In the presence of a nearby external object such as object 68, light 86 is reflected to detector 90 as reflected light 88 and is detected. The location of emitter 84 and detector 90 can be used to identify the location of object 68, so an array of emitters 84 and detectors 90 may be used as a position (touch) sensor (e.g., a position sensitive short-range proximity detector). If desired, a light-based array of the type shown in FIG. 9 may be used in gathering force input. Force (pressure) and/or touch input may also be gathered using other light-based sensors (e.g., optical time-of-flight sensors, optical proximity sensors using other patterns of emitters and detectors, etc.).

Figure 10:
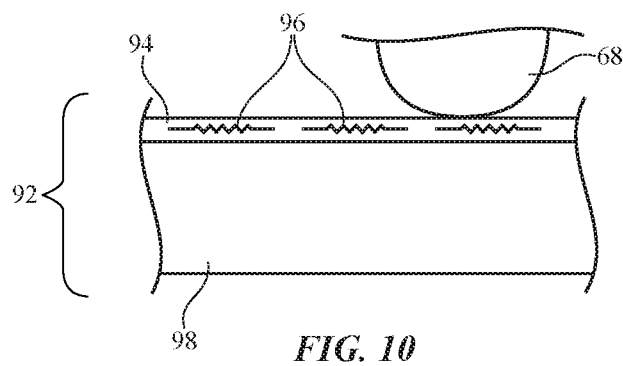
FIG. 10 is a side view of an illustrative sensor with resistors in accordance with an embodiment.

Illustrative sensor 92 of FIG. 10 has a layer of material such as material 98 (e.g., foam, plastic, fabric, etc.) and includes a layer on material 98 such as layer 94 with resistors 96. Resistors 96 may be thin-film resistors or other resistors that exhibit changes in resistance as a function of applied pressure. When external object 68 presses against resistors 96, the resistance changes in resistors 96 can be detected and the location of the pressure can be identified. Resistors 96 may be arranged in an array of rows and columns or other suitable array, may form bridge circuits (e.g., to form strain gauges), or may be mounted in other configurations. Sensor 92 may measure applied force (i.e., sensor 92 may be a pressure-sensitive component that serves as a force sensor) and may gather position information on applied input (e.g., sensor 92 may serve as a touch sensor).

Figure 11:
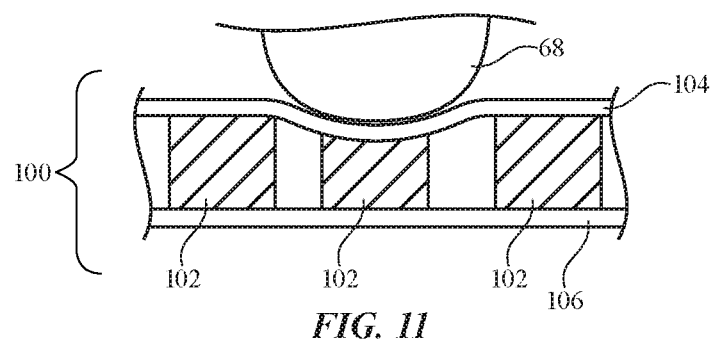
FIG. 11 is a cross-sectional side view of an illustrative sensor with an array of compressible force-sensing elements in accordance with an embodiment.

FIG. 11 shows how device 10 may be provided with a force sensor that has an array of force sensing elements 102. Elements 102 may be piezoelectric elements, resistor-based strain gauges, or other strain gauge elements that generate a signal responsive to applied force. Sensors 102 may be mounted in an array and may be monitored using signal traces in associated interconnect layers such as layers 104 and 106 (e.g., fabric layers, flexible polymer layers, etc.). If desired, elements 102 may use variable resistance, variable capacitance, or other principles to generate force-sensitive output signals. The example of FIG. 11 in which elements 102 are piezoelectric elements is merely illustrative.

If desired, sensors 26 may include other types of sensors for gathering information on the position and force of external objects adjacent to device 10. The arrangements of FIGS. 4-11 are examples.

Figure 12:
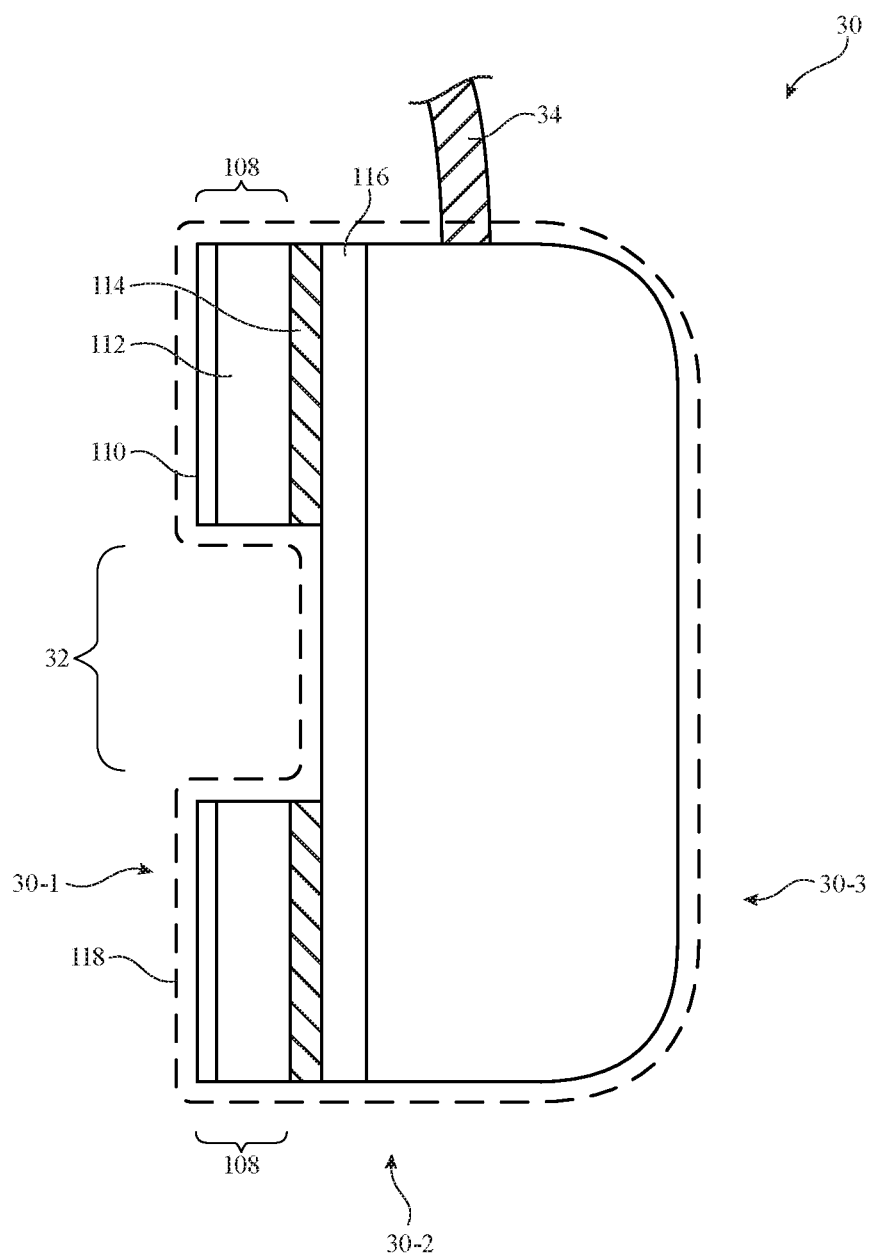
FIG. 12 is a side view of a portion of a headphone with a ring-shaped sensor that runs around a central speaker area in accordance with an embodiment.

FIG. 12 is a side view of one of ear cups 30 in an illustrative configuration in which a sensor has been formed on inner surface 30-1. In the example of FIG. 12, sensor 108 has an outer ring-shaped layer 110 and an opposing inner ring-shaped layer 114. A compressible ring-shaped layer of material such as layer 112 may be interposed between layer 110 and layer 114. Layers 110, 112, and 114 may have central openings that are aligned with each other and that form a passageway in region 32 to allow sound from a speaker in cup 30 to be emitted for a user. Layers 110 and 114 may have patterned capacitive touch sensor electrodes (e.g., ring-shaped electrodes that surround opening 32, etc.) that allow sensor 108 to serve as a touch sensor array. If desired, sensor 108 may also be sensitive to capacitance rises due to compression of layer 112 (i.e., sensor 108 may supply force output as well as touch output so that sensor 108 may serve as a hybrid touch-force sensor). A layer of material such as layer 118 (e.g., fabric, etc.) may cover sensor 108 and/or may form part of sensor 108.

Figure 13:
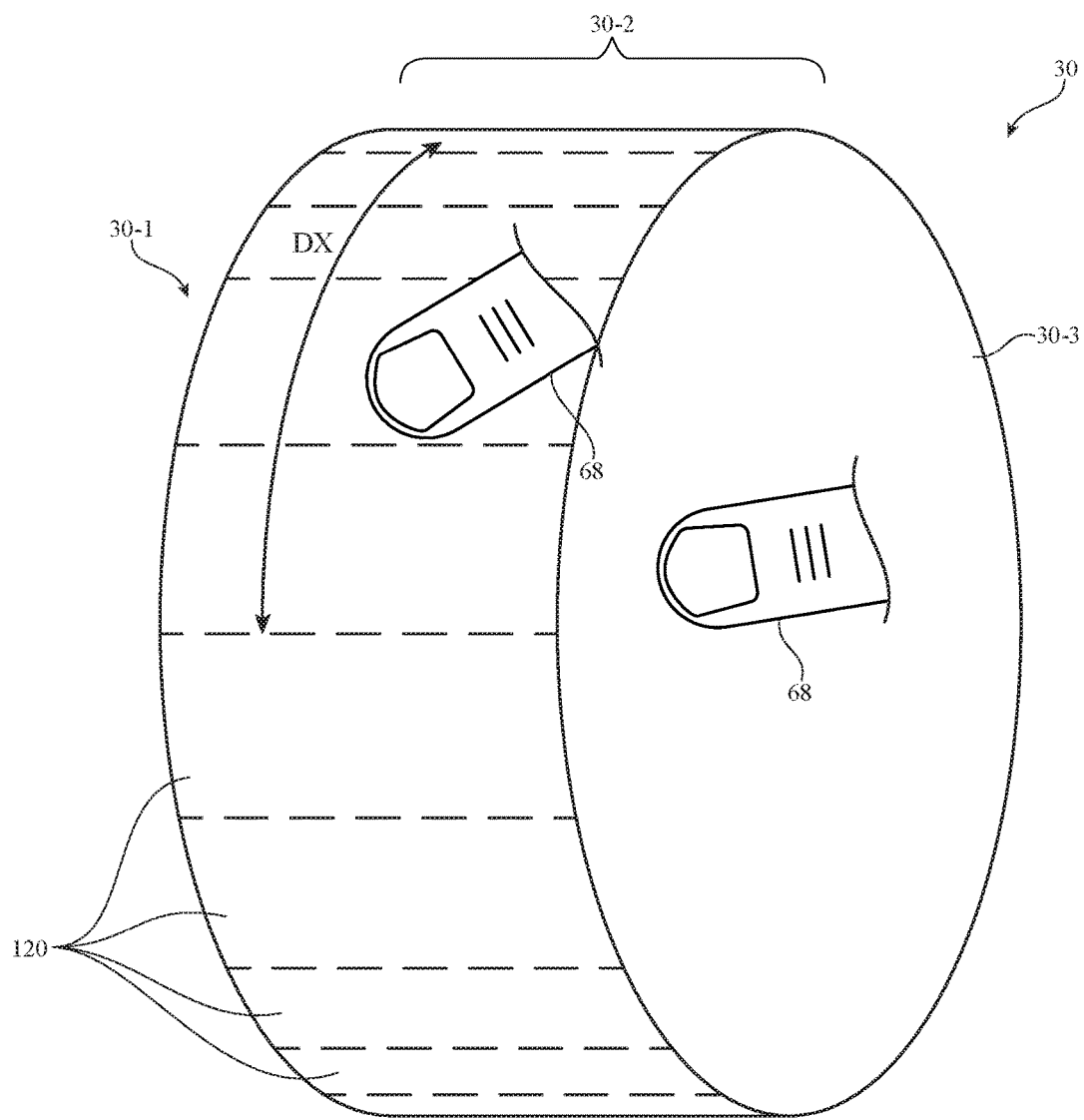
FIG. 13 is a perspective view of an illustrative headphone having external surfaces that can gather input from a user's fingers or other external objects in accordance with an embodiment.

FIG. 13 shows how ear cups 30 may be provided with an array of capacitive touch sensor electrodes (or other touch sensor elements) such as electrodes 120 that extend around peripheral surface 30-2 of each ear cup 30. Electrodes 120 may be used to form a touch sensor that measures the position of user input along dimension DX of FIG. 13 (i.e., distance around the periphery of cup 30). Touch sensors may also be formed from arrays of electrodes on inner cup surfaces such as surface 30-1 and outer cup surface 30-3. The touch sensor on inner cup surface 30-1 may measure the shape of the user's ear and thereby determine whether the right or left ear is in contact with the sensor. The touch sensor on outer cup surface 30-3 may be used to gather touch input from the user's finger or other external object 68. If desired, the sensor that includes elements 120 and/or the sensors on inner surface 30-1 and outer surface 30-3 may be hybrid touch-force sensors or other sensors, as described in connection with FIGS. 4-12.

Figure 14:
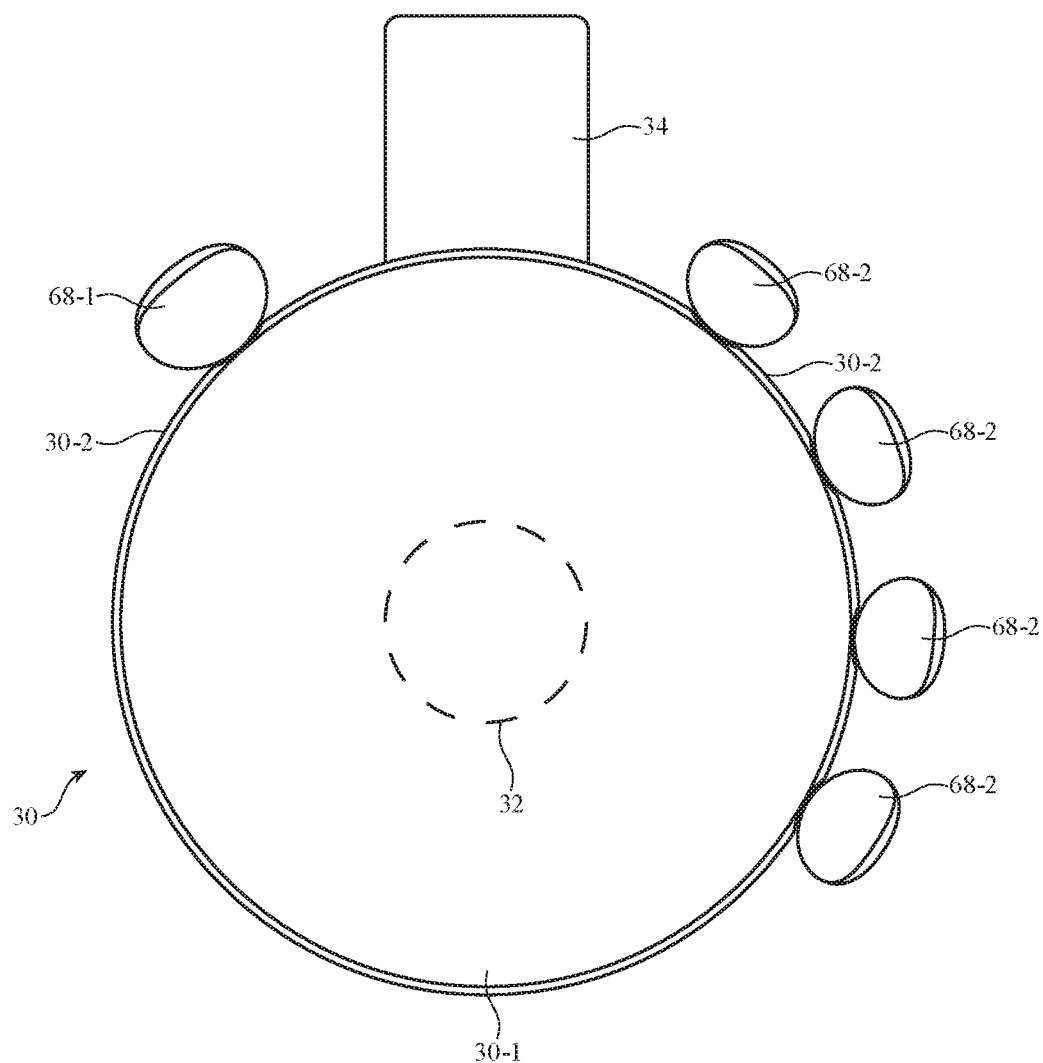
FIG. 14 is a side view of an illustrative headphone of the type shown in FIG. 13 in which a sensor is being used to detect a user's grip on the headphone by analyzing the pattern of finger contacts between the user's fingers and thereby discriminating between left-hand and right-hand grip patterns in accordance with an embodiment.

Using the touch sensor formed from elements 120 or other sensor on surface 30-2, device 10 may monitor a user's fingers. When a user grips an ear cup, the user's thumb (finger 68-1 of FIG. 14) will generally be positioned on an opposing side of surface 30-2 from the user's other fingers (fingers 68-2). By detecting the number of fingers in each location and by identifying the grip pattern of FIG. 14 (thumb 68-1 on one side and fingers 68-2 on the other), device 10 can detect whether a user has picked up each cup 30 with a left or right hand. Based on this information (i.e., by analyzing the touch input gathered by sensor 30-2 around the periphery of cup 30 to discriminate between left and right hand (finger) grips, device 10 can determine whether device 10 is being mounted on the user's head in an unreversed configuration or a reversed configuration. When the user's right hand is detected on the right ear cup and the user's left hand is detected on the left ear cup, device 10 can conclude that the user is holding device 10 in a way that allows the user to place the right cup over the right ear and the left cup over the left ear (i.e., device 10 will be used in the normal unreversed configuration). When the opposite pattern is detected (right hand grip on left cup and left hand grip pattern on the right cup), device 10 can conclude that the right and left cups will be reversed and that device 10 will be placed on the user's head in a reversed configuration. Ear shape measurements from sensors on surfaces 30-1 can also be used in determining the orientation of device 10 relative to the body of the user. If desired, additional data from sensors 26 may be used in determining device orientation. The use of hand grip patterns and ear patterns to discriminate between unreversed and reversed orientations for device 10 is merely illustrative.

Figure 15:
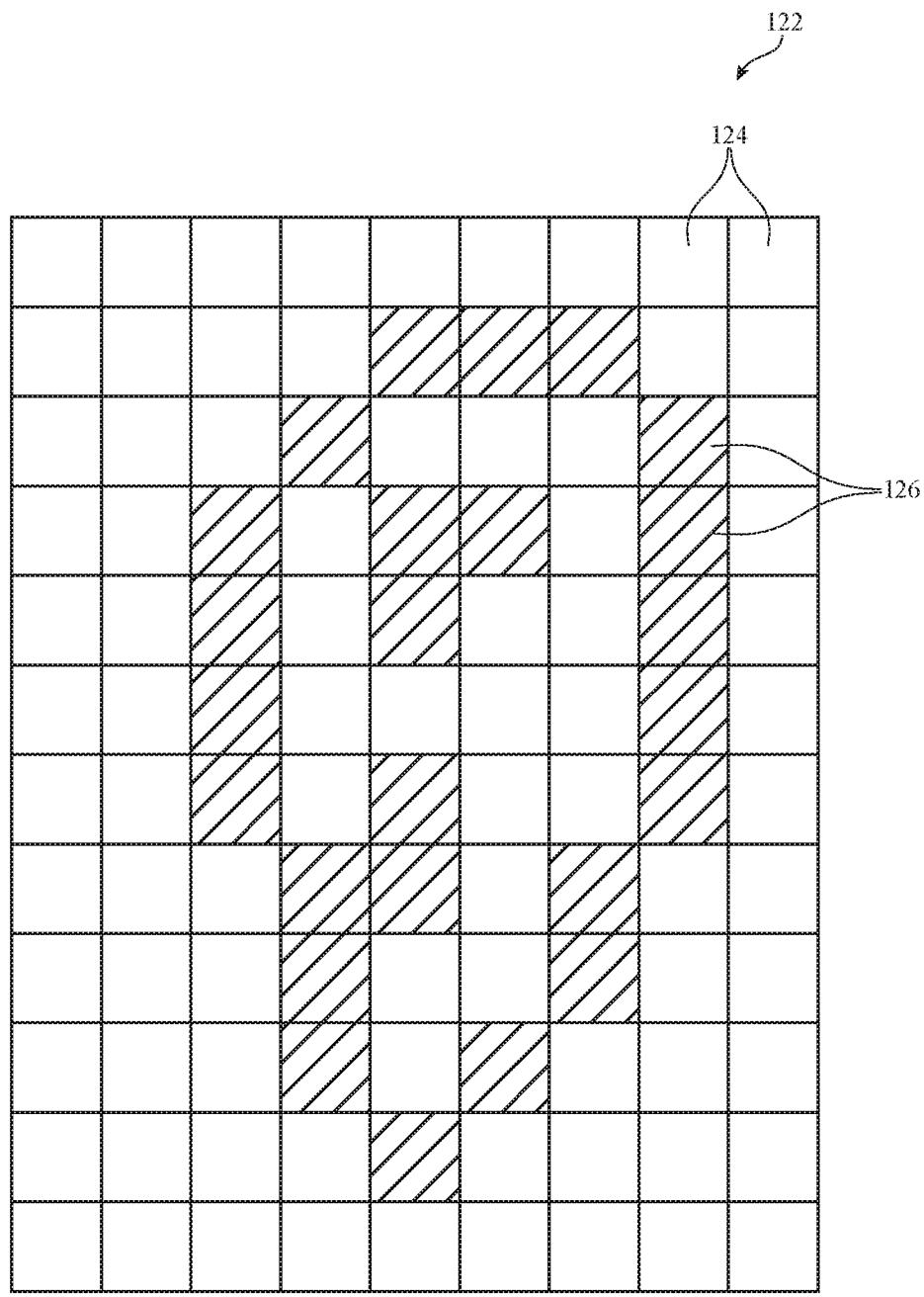
FIG. 15 is a diagram of output from an array of sensor elements that has made measurements on an adjacent body part of a user such as a user's ear in accordance with an embodiment.

FIG. 15 is a diagram showing illustrative output from a touch sensor array (or hybrid sensor, etc.) on cup surface 30-1 in the presence of a user's ear. Touch sensor elements that are not adjacent to a portion of the user's ear will produce little or no output, as illustrated by null elements 124. Elements that are adjacent to a portion of the user's ear will produce a measurable output, as illustrated by elements 126. The pattern of signals from elements 126 can be processed using a pattern recognition application running on control circuitry 20 or the resources of external equipment 10'. Device 10 (and/or equipment 10') can use the results of pattern recognition operations to determine which ear (left or right) is adjacent to each ear cup 30 and to take suitable action.

In the illustrative arrangement of FIG. 15, the sensor array is rectangular and has sensor elements arranged in rows and columns. Other patterns of sensor electrodes (e.g., capacitive touch sensor electrodes) may be used if desired.

Figure 16:
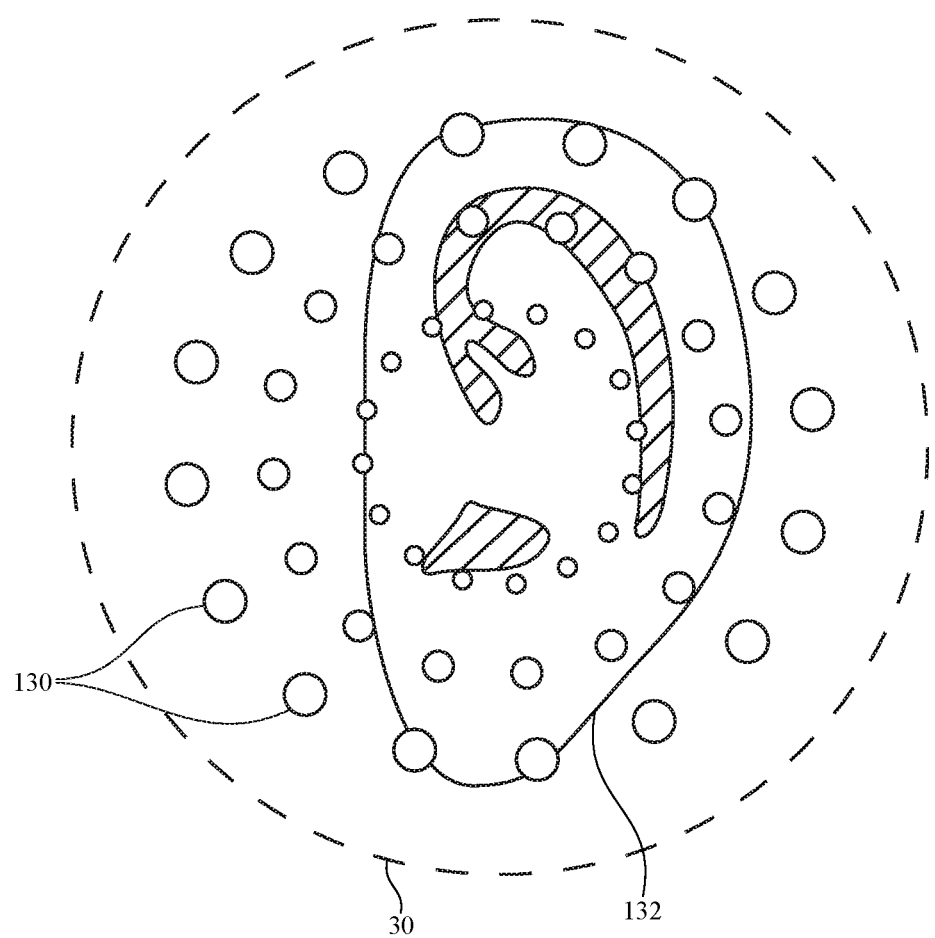
FIG. 16 is a diagram of an illustrative radially symmetric sensor element pattern for an ear shape sensor on a pair of headphones in accordance with an embodiment.

In the example of FIG. 16, potential sensor electrode locations 130 have been plotted against the illustrative structures of ear 132. Sensor electrode positions 130 of FIG. 16 have been arranged in a series of three concentric circles (with each circle having a corresponding circumferentially distributed set of sensor electrodes). Other patterns of sensing locations may be used, if desired.

Figure 17:
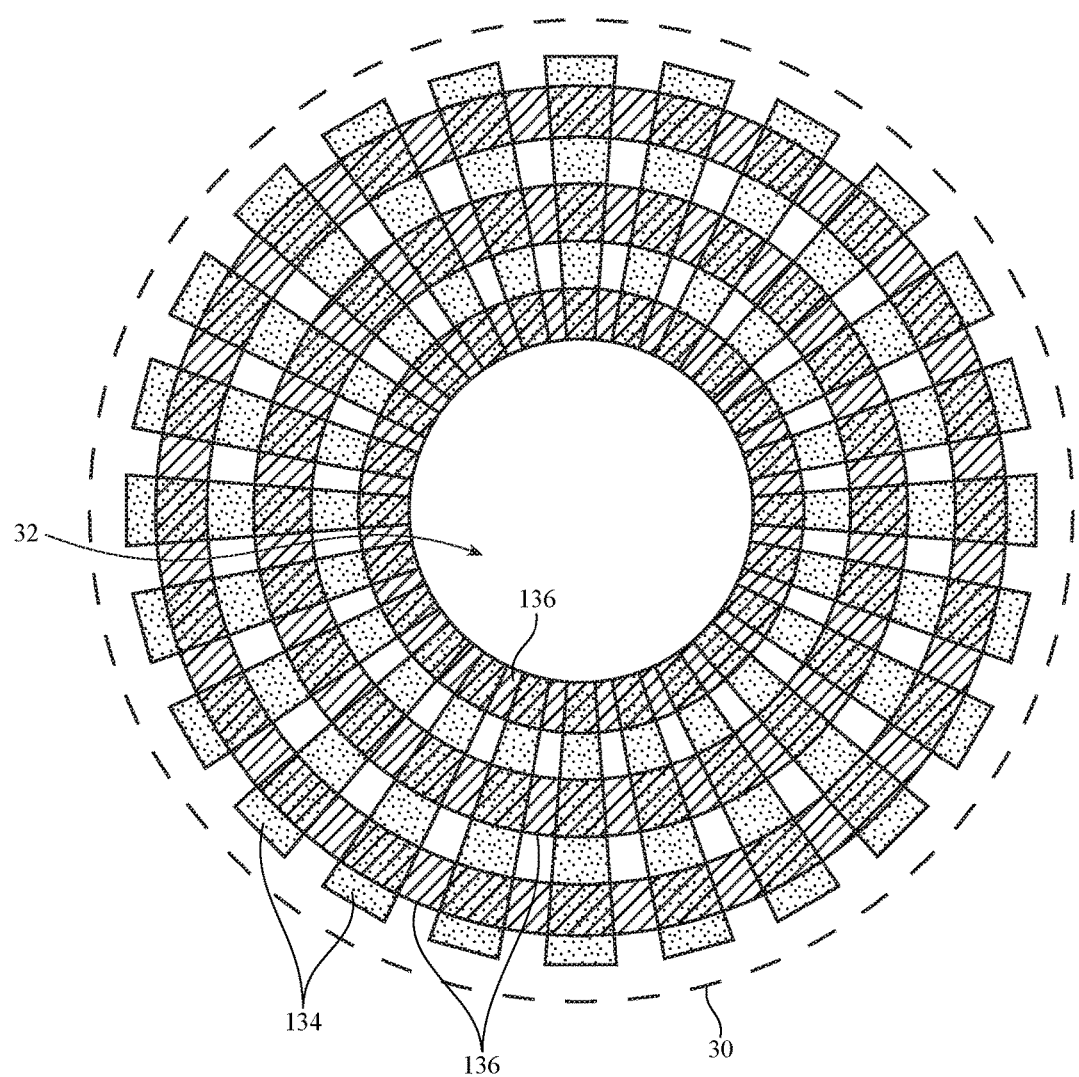
FIG. 17 is a diagram of an illustrative electrode pattern for an ear shape sensor such as a capacitive touch sensor having curved electrodes such as concentric ring-shaped electrodes and radially extending electrodes that overlap the ring-shaped electrodes in accordance with an embodiment.

An illustrative set of electrodes 134 and 136 that may be used in gathering capacitive touch sensor data at electrode positions 130 of FIG. 16 is shown in FIG. 17. Electrodes 134 extend radially outwards from center area 32. Circular electrodes 136 have ring shapes that extend around area 32 and that cross radially extending electrodes 136 at locations 130 of FIG. 16. The circular array of FIG. 16 may be used on circular portions of ear cups 30 such as inner portions 30-1 (to monitor ear shape) and outer portions 30-3 (to gather touch input form a user's finger).

Figure 18:
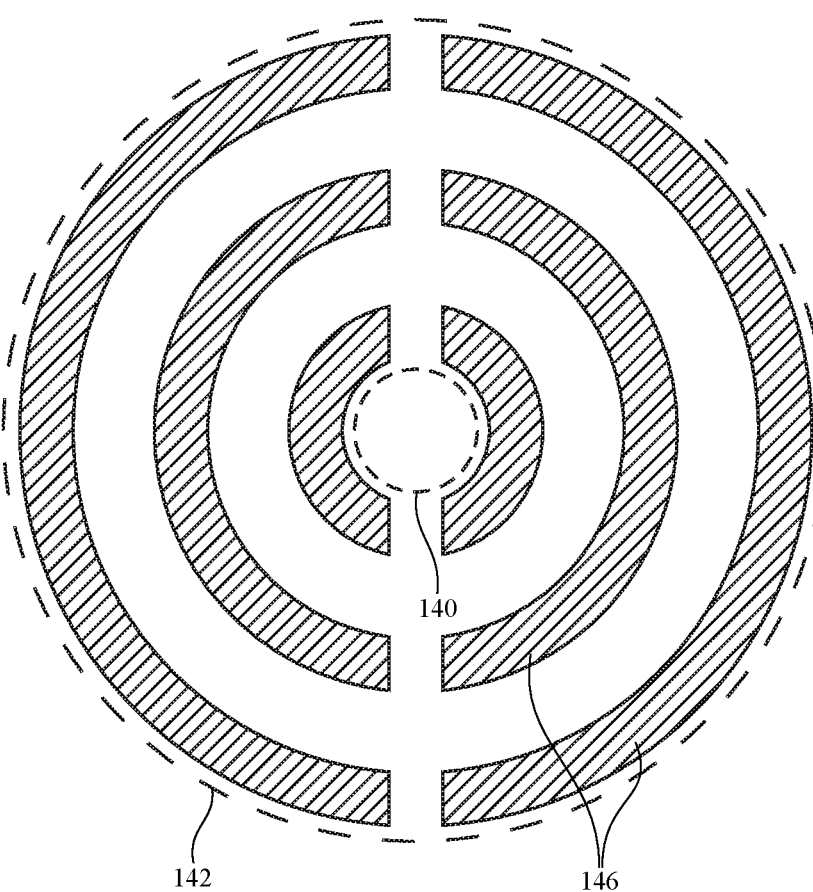
FIG. 18 is a diagram of an illustrative electrode pattern for the ear sensor having concentric ring-shaped electrodes that have been bisected along a vertical line in accordance with an embodiment.
Figure 19:
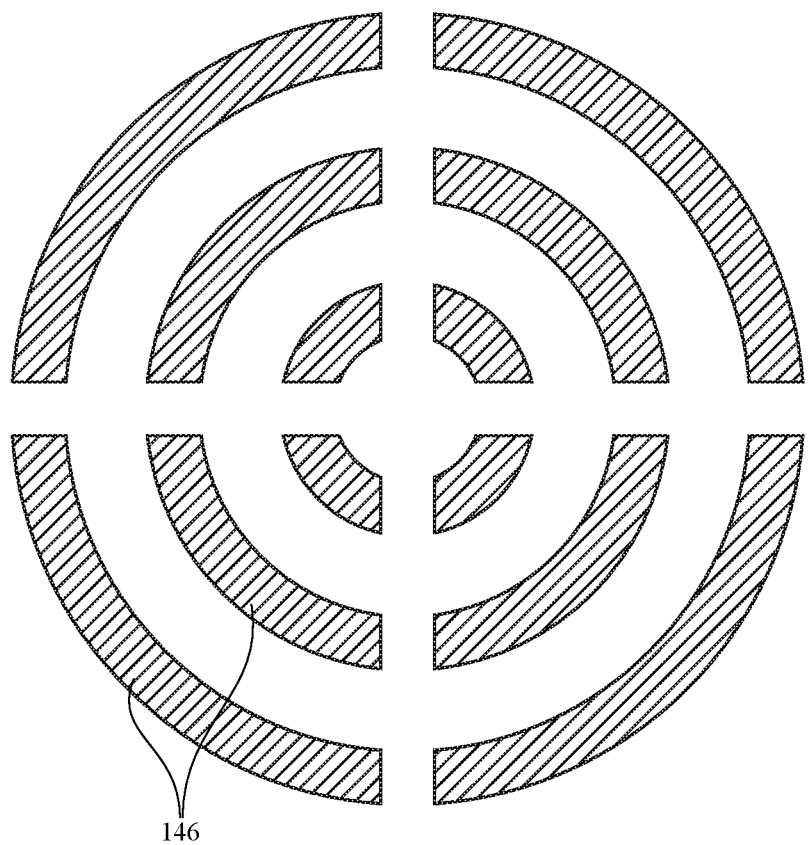
FIG. 19 is a diagram of an illustrative electrode pattern having four quadrants of concentric ring-shaped electrodes in accordance with an embodiment.

Another illustrative arrangement for electrodes in the touch sensor for ear cup 130 is shown in FIG. 18. With this arrangement, a circular ring-shaped ground plane having inner boundary 140 and outer boundary 142 is overlapped with a series of bisected concentric ring electrodes 146. In the configuration of FIG. 19, curved (ring-shaped) electrodes 146 have been divided into four quadrants. This is merely illustrative. Electrodes with different numbers of radially extending and circumferentially extending divisions may be used, if desired. Moreover, sensor input from ear sensors and/or finger sensors can be used in conjunction with other sensor data from sensors 26 to help identify user input, device orientation, and other operating conditions for device 10.

Figure 20:
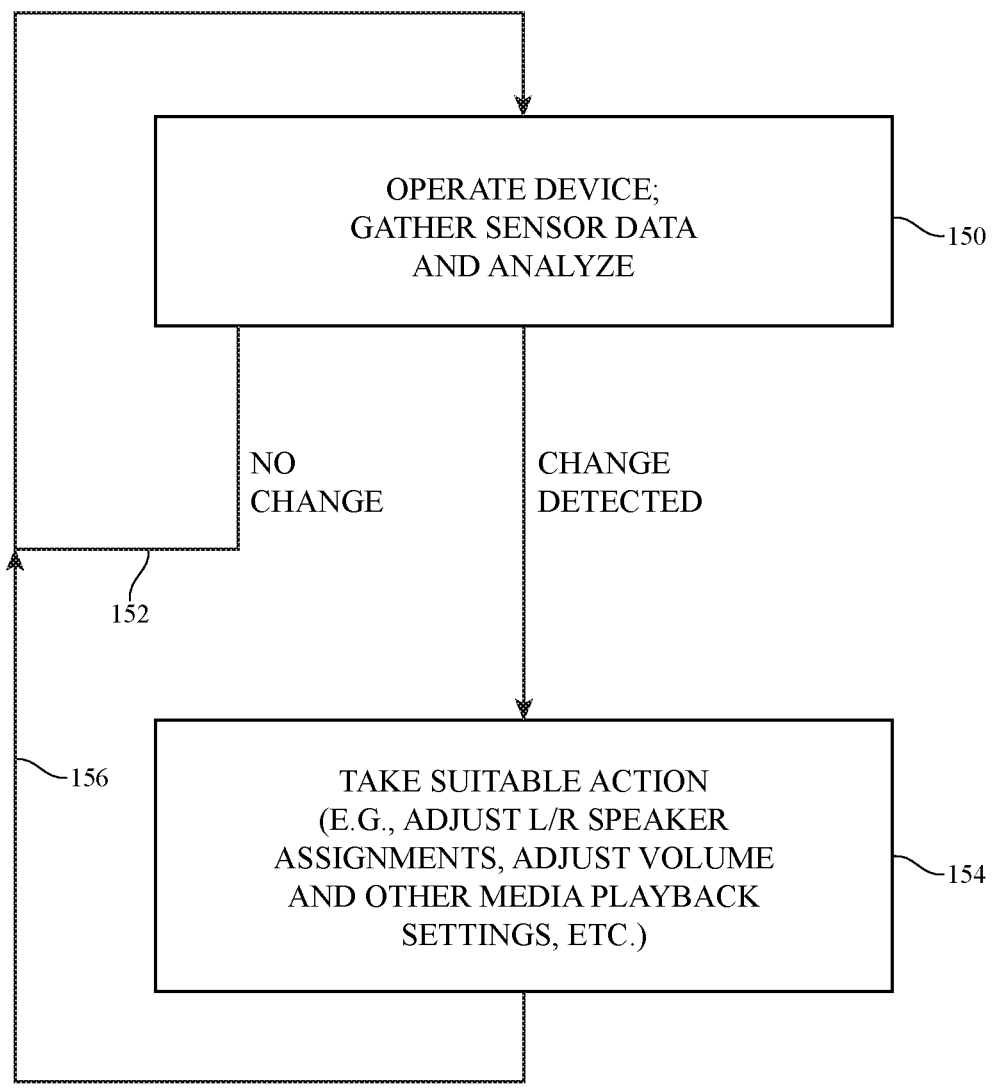
FIG. 20 is a flow chart of illustrative steps involved in operating an electronic device such as a pair of headphones having sensor structures in accordance with an embodiment.

FIG. 20 is a flow chart of illustrative steps involved in operating device 10. As shown in FIG. 20, device 10 (and, if desired, external equipment 10') may be operated normally at step 150 while gathering sensor data. For example, equipment 10' may stream wireless audio content to device 10 while playing corresponding video or other content on a display or other output device. Device 10 may receive the wirelessly transmitted audio and may play the audio to a user through speakers 42 (FIG. 3). Before playing the audio and/or while playing audio, device 10 may gather sensor data from touch sensors, force sensors, hybrid touch-force sensors, or other sensors on ear cups 30 and/or from other sensors 26. Control circuitry 20 in device 10 and, if desired, control circuitry in device 10' may analyze the sensor data. For example, the sensor data may be analyzed to determine which of the user's ears is in contact with each ear cup 30 and/or to determine which of the user's hands is gripping each ear cup 30, thereby determining the orientation (unreversed or reversed) of device 10 relative to the user's ears and head. Sensor data may also be gathered to determine whether a user's finger 68 has been placed at a particular location along dimension DX on surface 30-2 or a particular location on surface 30-1. Force input and single-touch and/or multi-touch gesture input may also be measured using sensors on surfaces 30-1, 30-2, and/or 30-3.

The input that is gathered during the operations of step 150 may be passive user input (e.g., when a user's ear shape and/or hand grip is being measured to discriminate between the left and right ears and to discriminate between the left and right hands without the conscious involvement of the user), may be environmental input (e.g., ambient temperature, ambient light level, etc.), and/or may be active user input (e.g., active user touch input such as user gestures, user force input, etc.). Passive user input may serve as biometric information (e.g., to identify different users of device 10 by their potentially distinctive ear shapes). Environmental sensor data (ambient light conditions, ambient temperature, location information, etc.) may help adjust the operation of device 10 to suit current environmental conditions (as an example).

Actively supplied user input can be used to adjust the operation of device 10 and device 10'. For example, active user input (e.g., touch input, force input, etc.) may be use to adjust media playback operations (pause, stop, play, fast forward, rewind, next track, skip tracks, other track controls, menu selections, etc.), may be used as gaming input (e.g., when device 10 is used as an input controller for a game), may be used to make on-screen menu selections (e.g., when a user is watching content on a display on equipment 10'), or may be used to otherwise control the operation of device 10 and/or device 10'. These adjustments may be made at device 10 (e.g., to mute speaker output temporarily) and/or at device 10' (e.g., to pause media playback by temporarily pausing the process of wirelessly streaming content from device 10' to device 10, etc.). As a user is listening to audio, for example, the user may move a finger along dimension DX on surface 30-2. Electrodes 120 or other touch sensor structures may measure the location and movement of the user's finger and may adjust audio playback volume or other media playback settings accordingly. In this way, a user can make adjustments to the settings of device 10 and device 10' without need to identify the locations of particular buttons on device 10.

If no desired change in operation is detected at step 150 (e.g., if device 10 is oriented as expected on the user's head, if no user input or other input is received that is suitable for making a change in operating setting for device 10, etc.), processing may loop back to step 150, as indicated by line 152.

If, however, it is determined that device 10 is being worn in a way that requires a change in operation for device 10 or device 10' (e.g., if it is determined that device 10 is being worn in a reversed configuration, if user input is detected, etc.), device 10 and, if desired, device 10' can take suitable actions in response at step 154. During the operations of step 154, device 10 can reverse audio playback so that right and left channel assignments are reversed to accommodate a reversed orientation for device 10 on the user's head, may make adjustments to media playback settings (in device 10 and/or device 10') and can otherwise adjust the operation of device 10 and device 10. Operations can then loop back to step 150, as indicated by line 156.

The foregoing is merely illustrative and various modifications can be made by those skilled in the art without departing from the scope and spirit of the described embodiments. The foregoing embodiments may be implemented individually or in any combination.

What is claimed is:

1. An electronic device that provides content to a user having fingers, comprising:
   control circuitry;
   ear cups containing speakers, wherein a given one of the ear cups has opposing first and second surfaces and a peripheral surface around a periphery of the given ear cup; and
   touch sensors on the peripheral surface of the given ear cup that detect touch input from the fingers of the user, wherein the touch input includes a first touch input on at least one of the touch sensors and a second touch input on the at least one of the touch sensors, wherein the first touch input comprises input from a plurality of the fingers on the at least one touch sensor, wherein the second touch input comprises moving a finger along the at least one touch sensor, wherein the control circuitry plays audio through the ear cups in accordance with left and right channel assignments, wherein the control circuitry determines whether to reverse the left and right channel assignments in response to the first touch input on the given ear cup, and wherein the control circuitry adjusts a volume of the audio in response to the second touch input on the given ear cup.

2. The electronic device defined in claim 1 wherein the control circuitry discriminates between right hand grips and left hand grips on the ear cups using the input from the plurality of the fingers.

3. The electronic device defined in claim 2 wherein the control circuitry determines whether the ear cups are to be worn by the user in an unreversed or a reversed configuration in response to discriminating between the right and left hand grips.

4. The electronic device defined in claim 3 wherein the control circuitry reverses the left and right channel assignments in response to determining whether the ear cups are to be worn by the user in an unreversed or a reversed configuration.

5. The electronic device defined in claim 1 wherein the control circuitry receives wireless content from external equipment and wherein the control circuitry plays audio for the wireless content through the speakers.

6. The electronic device defined in claim 5 wherein the control circuitry adjusts playback of the audio in response to the second touch input.

7. The electronic device defined in claim 6 wherein the ear cups have inner surfaces that rest against ears of the user and wherein the touch sensors further include capacitive touch sensor electrodes on the inner surfaces of the ear cups.

8. The electronic device defined in claim 7 wherein the control circuitry uses data from the capacitive touch sensor electrodes to discriminate between left and right ears.

9. The electronic device defined in claim 8 wherein the capacitive touch sensor electrodes include radially extending electrodes.

10. The electronic device defined in claim 8 wherein the capacitive touch sensor electrodes include ring-shaped electrodes.

11. The electronic device defined in claim 8 wherein the capacitive touch sensor electrodes include a plurality of concentric ring-shaped electrodes and a plurality of overlapping radially extending electrodes.

12. Headphones that play audio for a user having ears, comprising:
left and right ear cups having respective left and right speakers with which the audio is played for the user;
sensors on the left and right ear cups that sense finger positions on the left and right ear cups as the user grips the ear cups during placement of the headphones on the ears of the user, wherein the sensors comprise hybrid touch-force sensors having capacitor electrodes, wherein the hybrid touch-force sensors are configured to measure an applied force and to determine a location of the applied force, wherein a compressible layer is sandwiched between the capacitor electrodes, wherein the compressible layer is compressed in response to the applied force, and wherein the sensors comprise fabric with conductive strands that form the capacitor electrodes for the hybrid touch-force sensors; and
control circuitry that uses the sensed finger positions to adjust a volume of the audio and to select between unreversed and a reversed channel assignment configurations when playing the audio for the user.

13. The headphones defined in claim 12 wherein the control circuitry plays left channel audio through the left speaker and plays right channel audio through the right speaker in the unreversed channel assignment configuration and wherein the control circuitry plays right channel audio through the left speaker and left channel audio through the right speaker in the reversed channel assignment configuration.

14. The headphones defined in claim 13 and wherein the compressible layer is compressed in response to applied force to produce a capacitor increase that is indicative of an amount of applied force.

15. The headphones defined in claim 13 wherein the left and right ear cups have inner surfaces that rest against the ears and wherein the headphones further comprise capacitive touch sensor arrays on the inner surfaces that monitor ear shape to discriminate between left and right ears.

16. The headphones defined in claim 12 and wherein the hybrid touch-force sensors are configured to produce a capacitance increase that is indicative of an amount of applied force.

17. Headphones that are worn by a user, comprising:
speakers;
ear cups, wherein each of the ear cups includes a respective one of the speakers and wherein each of the ear cups has an inner opening and an outer peripheral portion;
control circuitry that plays audio through the speakers in an unreversed configuration in which left channel audio is played through a first of the speakers that is adjacent to a left ear of the user and right channel audio is played through a second of the speakers that is adjacent to a right ear of the user or a reversed configuration in which the right channel audio is played through the first speaker that adjacent to the left ear and the left channel audio is played through the second speaker that is adjacent to the right ear; and
capacitive touch sensors with ring-shaped capacitive touch sensor electrodes located on inner surfaces of the ear cups, wherein each of the ring-shaped capacitive touch sensor electrodes surrounds one of the speakers and wherein the control circuitry selects between the unreversed and the reversed configuration to play audio using the capacitive touch sensors, wherein the ring-shaped capacitive touch sensor electrodes extend from the inner opening to the outer peripheral portion of each of the ear cups, and wherein the ring-shaped capacitive touch sensor electrodes are configured to determine whether the right ear or the left ear is adjacent to one of the ear cups.

18. The headphones defined in claim 17 further comprising additional touch sensors on the ear cups with which the control circuitry measures finger positions as the user grips the ear cups.

* * * * *